No. 687,136. Patented Nov. 19, 1901.
W. DRAKE.
APPARATUS FOR THE MANUFACTURE OF GLASS BOTTLES, &c.
(Application filed Feb. 14, 1901.)
(No Model.)
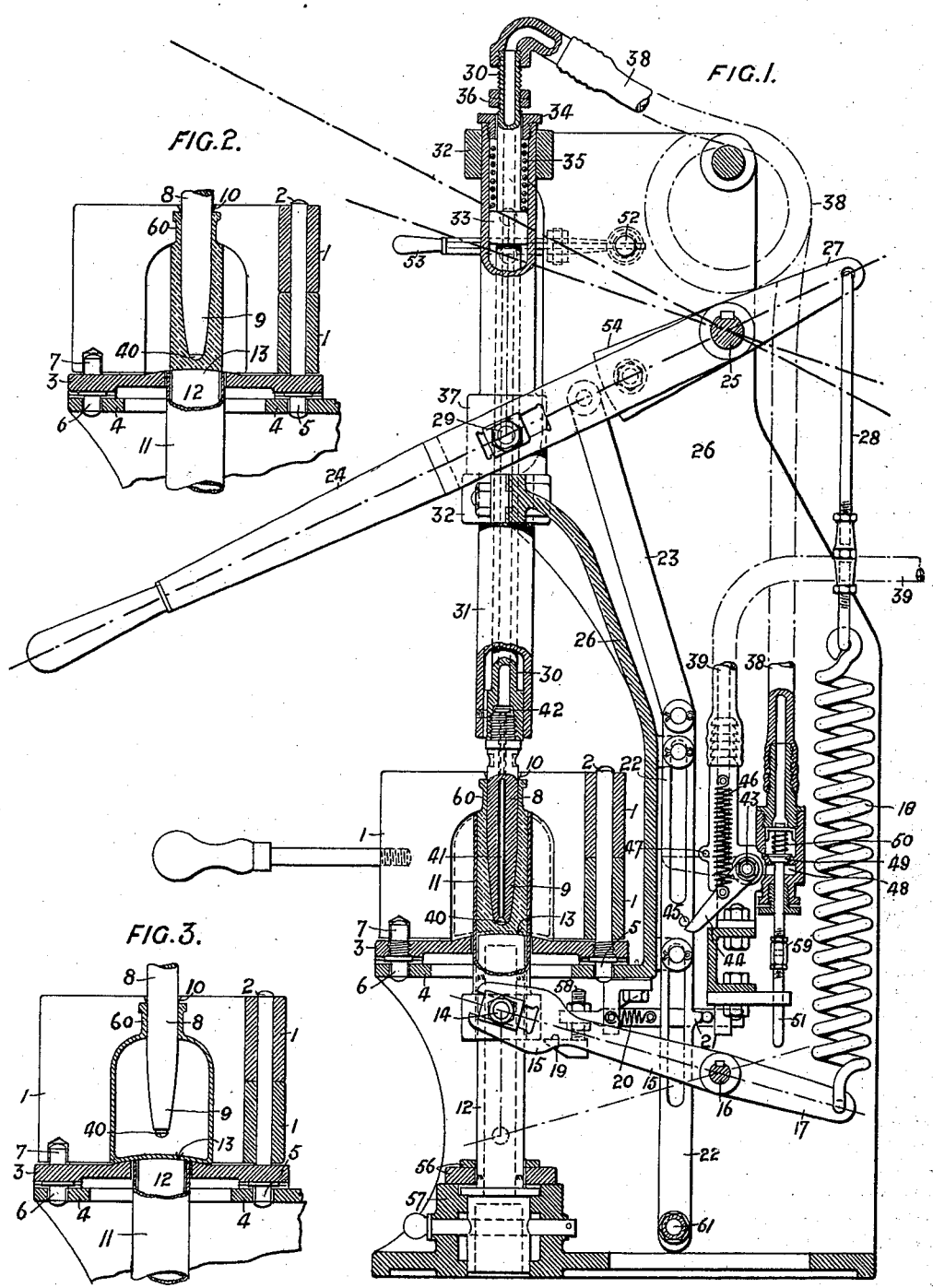
Witnesses:
Paul Hunter
A. H. Davis
Inventor
William Drake
By Munn
Attorneys

UNITED STATES PATENT OFFICE.

WILLIAM DRAKE, OF LONDON, ENGLAND.

APPARATUS FOR THE MANUFACTURE OF GLASS BOTTLES, &c.

SPECIFICATION forming part of Letters Patent No. 687,136, dated November 19, 1901.

Application filed February 14, 1901. Serial No. 47,249. (No model.)

*To all whom it may concern:*

Be it known that I, WILLIAM DRAKE, glass-bottle manufacturer, a subject of the Queen of Great Britain, residing at 34 Eagle street, Red Lion street, London, England, have invented new and useful Improvements in an Apparatus for the Manufacture of Glass Bottles and the Like, of which the following is a specification.
This invention relates to blowing glass bottles and the like in molds, and has for its object to enable mechanical blowing to be practically employed and the manufacture of the bottles to be accelerated and the cost of production reduced.

According to this invention although the operation of forming the bottle or other like vessel comprises two stages, the neck portion first being molded by positive mechanical pressure (as distinguished from air-pressure) and the body portion afterward blown in the mold, the successive movements of the parts are automatically coördinated in such manner that the formation of the bottle is greatly accelerated. The outer or blowing mold may be a two-part mold, and the blowing-tube is formed as a reciprocating plunger adapted to work through the neck of the mold and act as a displacer whereby to apply mechanical pressure to the glass for the purpose of thereby molding the neck portion of the bottle. In combination with this displacer-plunger I employ an inner temporary or "parison" mold adapted to contain the glass during the first stage of the operation and enable it to resist the pressure of the plunger, so that by the displacement of the latter the glass will on the descent of the plunger be forced up into the neck portion of the outer mold, and thus the perfect molding of the neck and mouth of the bottle as a preliminary to blowing the body portion thereof will be insured. This temporary or parison mold is a tube adapted to rise through an annular opening in the bottom plate of the blowing-mold concentrically with the neck portion, the upper edge of the tube when raised being adapted to make joint with the upper part of the shoulder portion of the blowing-mold immediately adjacent to the neck. This tube or temporary press-mold having fulfilled its function is afterward drawn downward until its upper edge is flush with the bottom plate in order that the operation of blowing the body of the bottle may be proceeded with, the movements of the tube or temporary mold and of the plunger being so coördinated that the former is suddenly withdrawn just as the plunger reaches its lowest position. The plunger is made tubular and is connected with the air compressor or reservoir, while the lower end of the plunger is closed by a valve opening outward under the pressure of the air when the latter is admitted under the control of automatically-actuated valves, as hereinafter explained.

Reference is to be had to the accompanying drawings, forming part of this specification, wherein I have represented, in—

Figure 1, a part-sectional elevation of the bottle-making machine, the parts being represented in a position in which the plunger has been brought down to press the glass in the temporary mold, which has been released and is just about to be withdrawn. Figs. 2 and 3 are similar (but partial) views representing the outer or blowing mold, the temporary or parison mold, the plunger, and the glass under treatment at various stages of the bottle-making operation.

The outer or blowing mold comprises two lateral parts 1 1, hinged together on a pin 2, fixed to the bottom plate 3 of the mold, which rests upon a bed 4 and is secured in position by dowel-pins 5 6, formed the one, 5, by a downward prolongation of joint-pin 2, while an upward prolongation of the other, 6, forms also a stop-pin 7 for the halves 1 of the mold to insure the said halves when closed being concentric with the plunger.

8 is the tubular plunger, having its lower end tapered externally, as at 9, to insure a sufficiency of glass toward the lower part as required for the formation by the blowing operation of a bottle-bottom of the required thickness. The cavity of the mold 1 corresponds to the intended form of the bottle, the mouth of the cavity of the mold preferably extending, as at 10, above the mouth of the bottle to be formed and being made of such size as to be exactly filled by the cylindrical portion of the plunger on its descent.

11 is the temporary or parison mold, (or "fence-tube,") fitted to work up and down through an aperture in the bottom plate 3 of the outer mold and about a pillar 12, of which the upper surface 13 is convexed to match the convex portion of the bottom 3, the temporary mold 11 completely filling the annular aperture between the plate 3 and the pillar 12, the upper edge of the temporary mold when in its lowest position being flush with the convex surfaces, which together form the bottom of the outer mold. The temporary mold 11 should be of rather larger internal diameter than the diameter of the neck portion of the outer mold, against the shoulder of which the upper edge of the temporary mold 11 fits when in the raised position, as shown. The temporary mold is guided by the pillar 12 and is engaged by trunnions and slide-blocks 14 with the slotted limbs of a pair of lever-arms 15, pivoted at 16 and moving together as one, the common tail end 17 of the lever being connected to a spring 18, by which the temporary mold 11 is drawn down when released from a latch 19, which when the temporary mold is in its highest position engages beneath its lower end and supports it in operative position within the outer mold, this latch being fitted to slide in fixed guides and pressed into position of engagement by a spring 20 or by a weight suitably applied to act on it and being retracted (at the moment when the temporary mold 11 is to be drawn down) by the action of a cam 21, carried by a sliding bar 22, which is connected by a link 23 with the hand-lever 24, by which the plunger is actuated and the spring 18 strained, as hereinafter described. The temporary mold 11 is raised to operative position within the main mold by a cross-head 61 on the bar 22 acting on the lever 15 at a given moment in the upward stroke of the hand-lever 24.

The lever 24 is pivoted at 25 to the standard 26 of the frame, and the tail end 27 of the lever is coupled by an adjustable link 28 to the spring 18, which is preferably of such length as to be more or less in tension in all positions of the lever 24 and parison-mold 11, while the forward member of the lever 24 is bifurcated and the limbs of the fork are slotted to receive slide-blocks working on trunnions 29, whereby the lever is operatively coupled to the plunger. The displacer part 8 of the plunger is carried by a tubular stem 30, held within a tubular sleeve 31, fitted to slide up and down in capped bearings 32 on the standard 26 under the operation of the lever 24. The stem 30 is fitted to slide in the sleeve 31 and is provided with a shoulder 33, between which and a cap 34 on the upper end of the sleeve a strong spring 35 is confined, the downward movement of the stem 30 relatively to the sleeve 31 being limited by an adjustable stop formed by a collar 36, screwing on the stem 30 above and adapted to bear upon the cap 34, so that the stem 30 and sleeve 31 move together as one, for the most part, except in so far as the yielding of the spring 35 may permit of independent movement. The downward stroke of the lever 24 is limited by a stop formed by a shoulder 37 on the sleeve 31 coming down upon the lower bearing 32, the said stop (in conjunction with the stop 36) also limiting the maximum downward stroke of the plunger.

The effective capacity of the temporary inner press-mold when the plunger has reached the limit of its downward stroke is less than would be required to contain a quantity of glass sufficient to fill the neck portion of the mold and to form the parison-bottle, so that the formation of a perfect bottle-neck by the displacement of the plunger will be insured, and the spring 35 (by yielding under compression) will permit the plunger to be arrested when the glass has been forced up to fill the neck portion of the mold, while the lever 24 and sleeve 31 complete their stroke until the stop 37 comes down upon the lower bearing 32. The upper end of the tubular stem 30 passes through the cap 34 and is coupled with the air-reservoir by flexible tubes 38 39, controlled by automatic valve mechanism, whereby the air is admitted to or shut off from the plunger at the proper moments.

In the lower end of the bore of the plunger 8 is seated a conical valve 40, opening downward and carried by a stem 41, passing loosely up through the bore and prevented from falling out by a spider-frame 42, confined loosely in a chamber in the bore. The lower face of the valve 40 is convexed, so as to project somewhat below the end of the plunger, in order that the valve shall be self-closing on meeting with the resistance of the glass on the descent of the plunger, the valve being self-opening under the air-pressure when the latter is admitted by the controlling-valve apparatus next described.

To the tube 39 from the air-reservoir is connected a rotary valve or cock 43, whose plug has a lever-arm 44, operated in the direction of opening the valve by a stud 45 on the rod 22 and in the direction of closing the valve by a spring 46, movement in this latter direction being limited by a stop 47. The delivery-port of this cock 43 opens into the valve-chamber 48 beneath a valve 49, held to its seat by a spring 50 and lifted at the proper moment by the lever 17 striking the lower end of the valve-stem 51. The valve 49 is thus opened just at the moment when the temporary mold 11 reaches its lowest position, and consequently the admission of air to the flexible tube 38 (which is connected to the upper part of the valve-chamber 48) and plunger 8 is dependent on the descent of the mold 11.

As the raising of the temporary mold 11 after the making of a bottle is effected by the upstroke of the hand-lever, as above described, and as it is necessary to allow time for the removal of the completed bottle before the temporary mold is thus raised again, a stop 52 is provided, whereby the upstroke of the hand-lever is temporarily arrested after the plunger has been raised clear of the mold and before the cross-head 61 engages the double lever 15. This stop 52 is a spring-pressed bolt fitted to slide in the standard 26 and retracted by a hand-lever 53, the bolt when in operative position projecting in the path of an arm 54, moving as one with the hand-lever 24. To enable the point of arrest to be varied to suit molds of different heights, this arm is adjustable as to height relatively to the hand-lever, to which it is fixed by a clamping-screw, as shown.

In order to permit of the necessary changes and adjustments to suit the height of the body portion of the bottle-mold, the temporary mold 11 is removable from the trunnion-ring 55, in which it is held, so as to admit of being replaced by one of different height. The cushions 56, of steel and hard wood, resting on the anvil or bed 57 and on which the trunnion-ring 55 of the temporary mold 11 drops, are replaceable by others of different thickness. The latch 19 is attached to its stem with capability of adjustment as to height, such as by means of a set-screw, as indicated at 58. The cross-head 61 is adjustably attached to the slide-bar 22, and the valve-rod 51 has a screw adjustment 59, whereby its length may be varied to suit the stroke of the lever-arm 17. The set-screw 58 passes through a slot-hole in the horizontal bar which carries the latch 19, so as to be laterally adjustable to accommodate parison-molds 11 of various diameters.

The operation is as follows: The temporary inner mold or tube 11 being raised and supported by the latch 19, a quantity of glass just sufficient—that is to say, not less or preferably very slightly more than sufficient—to form the bottle is introduced, and the mold having been closed the handle 24 is then drawn down until the stop 37 on the sleeve of the plunger comes down on the top of the lower bearing 32. When in this movement the end of the plunger 8 approaches the bottom of the mold, it presses upon the mass of glass, which, being prevented from spreading laterally, is forced upward into the space between the plunger 8 and the mold 11 and into the neck portion 60 of the outer mold, any excess of glass beyond that required to just fill said neck portion being accommodated by the diminished stroke of the plunger 8, permitted by the yielding of the spring 35. The complete formation of the neck of the bottle having been thus insured and the parison-bottle formed, the latch 19 will on the completion of the downstroke of lever 24 be withdrawn and permit the mold 11 to be suddenly drawn down by the stress of spring 18. During the downstroke of the hand-lever the cock 43 will have been opened in readiness to admit compressed air, and on the descent of the temporary mold 11 compressed air is admitted to the plunger by the opening of the valve 49. As the plunger 8 rises, the valve 40 in its lower end is forced open, and the air escaping expands the glass (which had filled the annular space included between the plunger and the temporary inner mold 11) outward against the hitherto vacant body portion of the blowing-mold 1, thus completing the formation of the bottle. Before the plunger has risen clear of the mold the supply of air is shut off by the closing of cock 43, and when the hand-lever comes against the stop 52 the mold can be opened and the finished bottle removed. The stop 52 being then withdrawn, the inner mold 11 will by the completion of the upstroke of the hand-lever 24 be raised against the stress of spring 18 to operative position, wherein it will be retained by the latch 19, the valve 49 being at same time permitted to close.

In Fig. 2 is represented the stage of the bottle-making operation immediately succeeding that shown in Fig. 1—that is to say, when the temporary or parison mold 11 has just fallen—and in Fig. 3 is represented the final stage, when the plunger having commenced its upward stroke the air-pressure has effected the blowing of the body portion of the bottle.

Having now particularly described and ascertained the nature of the said invention and in what manner the same is to be performed, I declare that what I claim is—

1. In apparatus for making bottles, the combination with the blowing-mold, of a temporary inner press-mold vertically movable, and adapted when raised to make a joint with the upper part of the blowing-mold around the neck portion thereof, and adapted when lowered to form a portion of the bottom of the blowing-mold, and a reciprocating tubular plunger arranged to enter the mouth of the blowing-mold, and adapted to act as a displacer within the temporary mold to press the glass into the neck portion of the blowing-mold and form a "parison" or partially-formed bottle-body, the said plunger being also adapted to act as a blowing-tube to expand the "parison-body" in the blowing-mold after the temporary mold is lowered, the plunger when in its lowest position extending to near the bottom of the mold and arranged to permit the air to pass from its lower end simultaneously with its rising movement, substantially as described.

2. In apparatus for making bottles, the combination with the blowing-mold having an annular orifice in the lower end thereof, of a tube, adapted to rise through said annular orifice and to make a joint with the upper part of the blowing-mold around the neck portion thereof so as to form a temporary inner press-mold, and adapted when lowered to fill up or close the said annular aperture so as to form a portion of the bottom of the blowing-mold, and of a reciprocating plunger, tubular and valve-closed at its lower end, so as to be adapted to act both as a displacer for pressing the glass in the temporary mold to give the mouth and neck of the bottle their final form and form a "parison" or partially-formed bottle-body, and as a means of admitting air for expanding the "parison-body" in the blowing-mold, the said plunger when in its lowest position extending to near the bottom of the mold and arranged to admit the air to the mold simultaneously with the rising movement of the plunger, as described.

3. In apparatus for making bottles, the combination with the blowing-mold having an annular orifice in the lower end thereof, of a tube, adapted to rise through said annular orifice and to make a joint with the upper part of the blowing-mold around the neck portion thereof so as to form a temporary inner press-mold, and adapted when lowered to fill up or close the said annular aperture so as to form a portion of the bottom of the blowing-mold, a reciprocating plunger, tubular and valve-closed at its lower end, so as to be adapted to act both as a displacer for pressing the glass in the temporary mold and as a means of admitting air for expanding the "parison" in the blowing-mold, an operating device having a definite stroke for imparting reciprocating motion to the plunger, and a spring interposed between the plunger and its operating device so as to permit of the plunger yielding to accommodate an excess of glass in the temporary mold, substantially as specified.

4. In apparatus for making bottles, the combination with the blowing-mold having an annular orifice in the lower end thereof, of a tube, adapted to rise through said annular orifice and to make a joint with the upper part of the mold around the neck portion thereof so as to form a temporary inner press-mold, a reciprocating tubular plunger adapted to act as a displacer within the temporary mold, a latch adapted to retain the temporary mold in operative position, a cam adapted to act on and release the latch on the completion of the downstroke of the plunger, a lever and spring connected to the temporary mold and to the plunger-operating device, so as to cause the spring to be strained concurrently with the descent of the plunger, in order to effect the withdrawal of the temporary mold when its latch is released on the completion of the downstroke of the plunger, substantially as specified.

5. In apparatus for making bottles, the combination with the blowing-mold having an annular orifice in the lower end thereof, of a tube, adapted to rise through said annular orifice and to make a joint with the upper part of the mold around the neck portion thereof so as to form a temporary inner press-mold, a reciprocating tubular plunger adapted to act as a displacer within the temporary mold, a latch adapted to retain the temporary mold in operative position, a cam adapted to act on and release the latch on the completion of the downstroke of the plunger, a lever and spring connected to the temporary mold and to the plunger-operating device, so as to cause the spring to be strained concurrently with the descent of the plunger, in order to effect the withdrawal of the temporary mold when its latch is released on the completion of the downstroke of the plunger, a stop for temporarily arresting the upward stroke of the plunger, and means operated by the plunger-operating device, for raising the temporary mold to operative position after the withdrawal of the stop, as described.

6. In apparatus for making bottles, the combination with the blowing-mold, a temporary inner mold adapted to rise through an annular orifice in the bottom of the blowing-mold, and to close said orifice when lowered, a reciprocating plunger adapted to act as a displacer and blowing-tube, mechanism whereby the plunger and temporary mold are conjointly operated in such manner that the temporary mold is suddenly withdrawn from the blowing-mold on the completion of the downstroke of the plunger and is raised into operative position within the blowing-mold on the completion of the upstroke of the plunger, of valves for controlling the admission of air to the tubular plunger, and means whereby the said valves are operated, the one from the plunger-operating device so that this valve is opened and closed at predetermined points in the descent and ascent respectively of the plunger, and the other from the temporary mold-operating mechanism so that this valve is opened when the temporary mold is fully withdrawn and closed on the return of the temporary mold to operative position, the opening and closing of the two valves being so coördinated that the admission of air to the plunger will be determined by the opening of the second valve (the first valve being already open) and cut off by the closing of the first valve independently of the position of the second valve, substantially as specified.

7. In an apparatus for making bottles, the combination with the blowing-mold, a temporary inner mold adapted to rise through an orifice in the bottom of the blowing-mold, and to close said orifice when lowered, a reciprocating tubular plunger adapted to act as a displacer and as a blowing-tube, mechanism for operating the plunger and temporary mold, and arranged to lower said temporary mold on the completion of the downstroke of the plunger and to raise said temporary mold into operative position on the completion of the upstroke of the plunger, and means for admitting compressed air to the plunger and actuated by the lowering of the temporary mold, as described.

8. In an apparatus for making bottles, the combination with the blowing-mold, an inner temporary mold comprising a tube adapted to rise through an annular orifice in the bottom of the blowing-mold and to make a joint with the upper portion of the blowing-mold around the neck portion thereof, and adapted when lowered to fill up or close said annular opening so as to form a portion of the bottom of the blowing-mold, of a tubular reciprocating plunger connected with a supply of compressed air, and adapted to act as a displacer within the temporary mold to give the mouth and neck of the bottle their final form and to produce a "parison" or partially-formed bottle-body, mechanism for operating the said plunger and tube conjointly, whereby the tube is suddenly lowered on the completion of the downstroke of the plunger, and means for controlling the admission of compressed air to the plunger, the air passing from the lower end of the plunger as the latter rises, to expand the "parison-body" in the blowing-mold, as described.

9. In apparatus for making bottles, the combination with the blowing-mold having an orifice in the lower end thereof, a fixed pillar extending into said orifice, the top of said pillar forming part of the bottom of the blowing-mold, a tube mounted on said pillar and adapted to rise through an annular space between the pillar and the wall of said orifice, and to make a joint with the upper part of the blowing-mold around the neck portion thereof, so as to form a temporary inner press-mold, the said tube when in its lower position being flush with the bottom plate and completing the bottom of the blowing-mold, of a tubular reciprocating plunger adapted to enter the mouth of the blowing-mold and extend to near the bottom of the mold, the said plunger having a valve at its extreme lower end, mechanism for operating the plunger and tube conjointly whereby the tube is suddenly withdrawn from the blowing-mold, on the completion of the downstroke of the plunger and means for admitting compressed air to the plunger, the air passing from the plunger as the latter rises, thereby expanding the glass from the bottom upward, substantially as described.

WILLIAM DRAKE.

Witnesses:
  C. G. CLARK,
  T. W. KENNARD.